United States Patent [19]

Goel et al.

[11] Patent Number: 4,757,115

[45] Date of Patent: Jul. 12, 1988

[54] THERMOSET POLYMER COMPOSITIONS

[75] Inventors: Anil B. Goel, Worthington; Timothy A. Tufts; Joseph G. Holehouse, both of Columbus, all of Ohio

[73] Assignee: Ashland Oil, Inc., Russell, Ky.

[21] Appl. No.: 931,496

[22] Filed: Nov. 17, 1986

Related U.S. Application Data

[63] Continuation-in-part of Ser. No. 698,724, Feb. 6, 1985, abandoned.

[51] Int. Cl.$^4$ .............................................. C08G 18/28
[52] U.S. Cl. ...................................... 525/440; 528/59; 528/66; 528/73; 525/502; 525/528
[58] Field of Search ............................. 528/59, 66, 73; 525/440

[56] References Cited

U.S. PATENT DOCUMENTS

| | | | |
|---|---|---|---|
| 4,101,527 | 7/1978 | Cunningham | 528/73 |
| 4,374,229 | 2/1983 | Dunnavant | 528/28 |
| 4,540,767 | 9/1985 | Goel | 528/60 |
| 4,558,113 | 12/1985 | Goel | 528/59 |

Primary Examiner—Patricia Short
Attorney, Agent, or Firm—H. M. Hanegan; M. E. Picken; D. L. Hedden

[57] ABSTRACT

Thermoset polymers are prepared by reacting an ethylenically unsaturated resin monomer and a bicyclic amide acetal with a polyisocyanate in the absence or presence of a vinyl monomer. Reaction rates are suitable for effecting RIM processing. The resultant polymers exhibit improved impact resistance. Further variation in physical properties can be achieved through the use of a diol chain extender for the polyisocyanate.

10 Claims, No Drawings

THERMOSET POLYMER COMPOSITIONS

CROSS REFERENCE TO RELATED APPLICATION

This is a continuation-in-part of pending application serial number 698,724 filed February 6, 1985, now abandoned.

BACKGROUND OF THE INVENTION

1. Field of the Invention

This invention relates to a thermoset polymeric composition derived from an ethylenically unsaturated ester or polyester resin monomer. More particularly, the invention relates to such compositions resulting from the incipient addition polymerization or copolymerization product of said resin monomer reacting with a polyisocyanate in the presence of a bicyclic amide acetal monomer.

2. Overview of the Prior Art

Polyester resinous compositions; i.e., ethylenically unsaturated polyester oligomers dissolved in a reactive diluent in the form of a vinyl monomer cross-linking agent, typically styrene, are most extensively used at present for preparing thermoset molded shapes. On balance the physical strength properties of such products are very good. However, for many end use applications the inherent brittleness of the resultant polymeric structure represents a definite drawback. The most satisfactory way to date for obviating this deficiency calls for employing a fibrous reinforcer. Glass fibrous materials in a variety of forms are most commonly resorted to for this purpose. There have been proposals for coping with the inherent brittleness of a cured polyester resinous composition through the conjoint use of a compatible thermoplastic polymer exhibiting an elastomeric property. The disadvantage of this approach is that invariably other desirable physical strength characteristics as well as certain chemical properties are undesirably compromised.

One of the more recent endeavors to upgrade the properties of a conventional polyester resinous composition is exemplified in U.S. Pat. No. 4,374,229. Therein the polyester entity of the contemplated systems is in the form of at least two ethylenically unsaturated oligomeric polyester segments joined together via a urethane linkage. Such polyester entities beyond containing the urethane linking residues additionally contain at least two acryloyl groups as part of their ethylenic unsaturation. A number of significantly improved chemical properties are evident upon the curing of such systems. On the other hand, the gains realized in physical strength properties are more modest. While dimensional stability as measured by higher heat distortion temperatures as well as fatigue resistance were improved, the impact resistance properties are of such an order allowing for only a minor reduction of the reinforcement content normally required for any given application. It is accordingly the principal object of this invention to structurally modify the aforesaid and like polymeric systems in order to obtain improved impact resistance without sacrifice of the other chemical and physical strength properties associated with same.

SUMMARY OF THE INVENTION

In accordance with the present invention thermoset polymeric compositions are provided via a resinification procedure basically involving the polymerization of a tripartite monomeric mixture. One constituent of said mixture is a resin monomer in the form of a hydroxyl group bearing ethylenically unsaturated linear oligomeric esterification product. The other constituents of the reactant mixture include a polyisocyanate and a bicyclic amide acetal. Depending on the nature of the oligomer unsaturation a vinyl cross linking agent is present for the purpose of increasing crosslink density.

The structural incorporation of the bicyclic amide acetal into the contemplated polymeric systems most importantly gives rise to a substantial improvement in the impact resistance of the cured neat polymer. In addition to this unique advantage there are a number of others to be realized. The bicyclic amide acetal serves as an excellent solvent for the resin monomer. In general molding operations, and particularly in RIM (reaction injection molding) processing, this capability offers distinct advantages. Another important feature of the amide acetal resides in the inherent ability of the compound to catalyze the various reactions occurring during the resinification process. Thus the amide acetal catalyzes the urethane reaction, the formation of isocyanurate residues and autocatalyzes the reaction with the isocyanate monomer. Curing rate is accordingly enhanced which is always desirable in molding operations and particularly so in RIM processing.

DESCRIPTION OF THE PREFERRED EMBODIMENTS

Of the various resin monomers useful in the practice of this invention the oligomeric polyesters disclosed in the aforementioned U.S. Pat. No. 4,374,229 represent the preferred component of the contemplated systems. These polyesters are basically composed of a linear backbone of essentially alternating dicarboxylic acid and diol residues. All or at least part of said diacid residues are derived from an $\alpha,\beta$-ethylenically unsaturated dicarboxylic acid such as maleic acid which preferably are subsequently isomerized to the corresponding trans configuration. These polyesters are singularly characterized by their terminal end groups; one being an acryloyl or methacryloyl group and the other being a hydroxyl group.

Advantageously the hydroxy group bearing free radically polymerizable ethylenically unsaturated oligomeric ester or polyester contains at least one vinyl group of the formula:

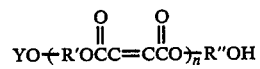

where Y is H or

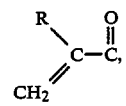

R is hydrogen, an alkyl group or an aryl group, R' and R" are independently an alkylene group or an alkylene ether group having from 2 to 10 carbon atoms, and n is an integer from 0 to 10. The applicable oligomers are conveniently prepared through means of a step-growth reaction whereby a diacid anhydride and epoxy compound; e.g., propylene oxide, progressively add in an alternating fashion to an active hydrogen atom containing initiator. The specific initiators employed to prepare such polyesters are limited to the indicated acrylic acids or the half acid ester of the glycol corresponding to the epoxy reactant. Further details concerning this method are set forth in the above-referenced patent.

Another class of ethylenically unsaturated oligomers useful herein are the so-called polyester diols. These are low molecular weight polyesters generally containing on the average one or two ethylenically unsaturated dicarboxylic acid residues and terminated at each end with a hydroxyl group. Maleic anhydride represents the preferred diacid reactant for preparing said diols. The latter can be prepared by the conventional condensation method or by the step-growth method described above for preparing the acryloyl containing oligomers. The relatively high temperatures and extended reaction time experienced in preparing the polyester diol by the conventional condensation method results in substantially complete conversion of the maleo residues to fumaro residues. The alternate method contemplated for preparing the polyester diol requires a separate isomerization step. Due to the indicated nature of the ethylenic unsaturation of the polyester diol, a vinyl monomer cross linking agent is used in conjunction therewith. As is the case with the curing of the conventional polyester compositions a variety of vinyl monomers are applicable but styrene is universally preferred.

A further exemplary class of resin monomers in context of the present invention include the so-called vinyl esters. The term broadly connotes the reaction products of an acrylic acid and epoxy resins having oxirane oxygen group polyfunctionality. The epoxy resins employed for preparing the preferred vinyl esters are based on two principal types. The glycidyl ethers of an aromatic polyol derived by reacting an aromatic polyol, especially bisphenol A, with epichlorohydrin constitutes one of such types. The other type include the glycidyl ether derivatives of a novolak. A wide range of these products are commercially available.

The bicyclic amide acetals useful for preparing the thermosetting systems contemplated herein are the substituted oxazolo oxazoles structurally corresponding to the following general formula:

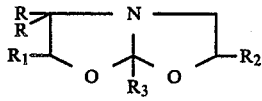

wherein R is H or alkyl; $R_1$ and $R_2$ is H, alkyl, aryl or alkoxy; and $R_3$ is alkyl, alkaryl or aryl. The bicyclic amide acetals can be prepared by the reaction of a dialkanolamine and a nitrile. The preferred amide acetal is prepared by the reaction of diethanolamine and acetonitrile resulting in a compound corresponding to the above formula wherein R, $R_1$ and $R_2$ is hydrogen and $R_3$ is methyl. A suitable but less facile method for preparing the amide acetals depicted above involves the reaction of a 2-oxazoline and an epoxy compound. In those instances where the nitrile or epoxy compound is polyfunctional the resultant bicyclic amide acetal is correspondingly polyfunctional. The latter amide acetals are likewise suitable for use in the practice of this invention. The bicyclic amide acetal reacts readily with an isocyanate and in respect to this reaction is difunctional in nature. Each mole of the amide acetal is accordingly regarded as having two pseudo hydroxy equivalents.

A variety of aromatic and aliphatic polyisocyanates are suitable for use in the practice of this invention. Representative aromatic polyisocyanates include toluene diisocyanate, xylylene diisocyanate, p-phenylene diisocyanate, diphenyl diisocyanate and methylene-4,4'-diphenyl diisocyanate (MDI) as well as the various polymeric analogs thereof. Examples of aliphatic polyisocyanates are such as 1,4-tetramethylene diisocyanate, hexamethylene diisocyanate, isophorone diisocyanate and methylcyclohexyl diisocyanate. MDI and the polymeric analogs thereof are the preferred polyisocyanates.

In conjunction with the use of the foregoing polyisocyanates in accordance with this invention, one can advantageously employ a diol extender for obtaining a prepolymer of the selected polyisocyanate as is a common practice in the urethane polymer art. Particularly applicable extenders for this purpose are the various polyoxyalkylene glycols. The prepolymer need not be preformed but can be conveniently generated in situ in the course of curing the thermosetting composition.

Depending on a number of objective considerations the ratio of the resin monomer to bicyclic amide acetal can vary substantially. The principal consideration governing this relationship resides in realizing the properties sought for the polymeric composition in its end-use application. The specific resin monomer utilized is likely the most determinative contributing factor in this regard. In general, however, the combined avoirdupois relationship of such components can broadly range from 99 to 50% of the resin monomer and correspondingly from 1 to 50% of the bicyclic amide acetal. The content of polyisocyanate present in the thermosetting composition can likewise vary substantially. This overall relationship is expressed in terms of the isocyanate index of the composition which denotes the numerical ratio the NCO equivalents present bears to the combined equivalents of OH present, the latter including the pseudo OH groups associated with the bicyclic amide acetal as previously indicated and those of a diol extender if present. On this basis the isocyanate index broadly ranges from about 0.8-3.

The working examples presented below serve to illustrate the present invention including the best mode contemplated for carrying out same. All parts specified as such are parts by weight unless otherwise indicated.

EXAMPLE I

Preparation of Resin Monomer A

Into a suitable resin reaction vessel were charged 321 parts of maleic anhydride, 309 parts of methacrylic acid, 1.26 parts of hydroquinone and 3.25 parts of magnesium hydroxide. The reactor was evacuated to 0.2 atmosphere and dry nitrogen bled into one atmosphere. With agitation the reactor contents were heated to 60° C., whereupon 558 parts of propylene oxide were added at a rate so that the temperature was maintained constant at about 120° C. On completion of the propylene oxide addition, heating was continued at the indicated temperature until the acid value of about 0.5 was obtained. The resultant product exhibited a hydroxyl value of 187 corresponding to a calculated average molecular weight of about 300.

To the reactor contents were added 11 parts of morpholine and with agitation held at 80° C. for about 20 minutes. Analysis of the resultant product indicated that in excess of 95% of the starting maleo residues were summarized to fumaro residues. Various experiments exemplifying the present invention were carried out based on the above-described resin monomer A. In each experiment the individual components of the thermosetting composition were admixed and then molded in a glass plate mold to provide 1/8" thick castings Tertiary butylperbenzoate in the amount of 0.5 weight percent of the composition was uniformly employed as the free radical initiator. The cure schedule consisted of 1 hour at 100° C. followed by 2 hours at 130° C. The Heat Distortion Temperature (ASTM-D648) and the Notched Izod Impact (ASTM-D256) were determined for specimens of the individual castings. The composition of the experimental castings and the test results obtained are outlined in the following Table No. I.

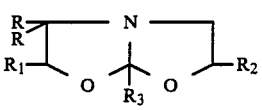

Wherein R is H or alkyl; $R_1$ and $R_2$ is H, alkyl, aryl or alkoxy; and $R_3$ is alkyl, alkaryl or aryl and (3) a hydroxy group bearing free radically polymerizable ethylenically unsaturated monomer, containing at least one vinyl group of the formula:

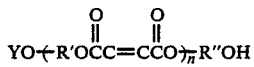

where Y is

TABLE I

| Exp. | Resin Monomer A | Polyisocyanate[1] | Bicyclic Amide Acetal[2] | Diol Extend FR | Styrene | Heat Dist Test°6 | Notched IZOD-FT-LB/IN |
|---|---|---|---|---|---|---|---|
| 1 (blank) | 100 | 51 | — | — | — | 130 | 0.25 |
| 2 | 100 | 122 | 30 | — | — | 139 | 0.5 |
| 3 | 100 | 430 | 160 | — | — | 129 | 0.45 |
| 4 | 100 | 453 | 160 | 83[3] | — | 126 | 0.81 |
| 5 | 100 | 130 | 30 | 60[3] | — | 106 | 0.53 |
| 6 | 100 | 130 | 30 | 60[4] | — | 139 | 0.3 |
| 7 | 100 | 124 | 53 | 97[5] | — | 91 | 0.5 |
| 8 | 100 | 177 | 53 | — | 50 | 148 | 0.3 |

[1]ISONATE 143L (UPJOHN) - a proprietary polymeric MDI type isocyanate having an average of about 2.2 isocyanate groups per molecule.
[2]Tetrahydro-(7a-methyl)-oxazolo[2, 3-b] oxazole.
[3]POLYMEG 1000 (Quaker Oats) Poly(tetramethylene ether) diol of 492 equivalent wt.
[4]R45-HT (ARCO POLYMERS, INC. 0-hydroxy terminated polybutadiene of 2800 ave. mol. wt.

EXAMPLE II

A polyester diol was prepared following the general procedure given in Example I. Initially maleic anhydride (1.0 mol) was reacted with cyclohexanedimethanol (0.75 mol). The resultant product was capped with propylene oxide (1.0 mol). Catalytic isomerization was carried out as described in said example. The final product exhibited an acid value (AN) of 1.0, an equivalent weight of 200 and a molecular weight of 400.

A thermosetting composition based on the above resin monomer was prepared having the following weight amounts of the respective components.

| | |
|---|---|
| 80 | polyester diol |
| 20 | cyclohexane dimethanol |
| 20 | bicyclic amide acetal of Example I |
| 14.5 | 2-ethylhexyl acrylate |
| 14.5 | iso-decylmethacrylate |
| 170 | Isonate 143L |
| | tertiary-butyl perbenzoate |

Castings were prepared as described in Example I. Test specimens exhibited the following physical properties:

| HDT | 125° C. |
|---|---|
| Notched Izod | 0.94 ft. lbs./inch |
| Unnotched Izod | 12 ft. lbs./inch |

What is claimed is:

1. An interconnected polymer comprising the substantially insoluble and infusible cured polymerization reaction product of (1) a polyisocyanate, (2) a bicyclic amide acetal corresponding to the formula:

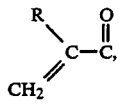

R is hydrogen, an alkyl group or an aryl group, R' and R" are independently an alkylene group or an alkylene ether group having from 2 to 10% carbon atoms, and n is an integer from 1 to 10 and therein the isocyanate index of the resin-forming reaction mixture is between about 0.8 and 3 and wherein the relative weight ratio of (2) and (3) is from 1:99 to 50:50, respectively.

2. A polymer according to claim 1 wherein component (3) is a linear polymerizable monomer terminated at one end with an acryloyl or methacryloyl group and at the other end with a hydroxyl group and having ethylenic unsaturation in the form of fumaro unsaturation.

3. A polymer according to claim 2 wherein the polyisocyanate is an aromatic polyisocyanate.

4. A polymer according to claim 3 wherein the aromatic polyisocyanate is methylene-4, 4'-diphenyl diisocyanate (MDI) or polymeric MDI.

5. A polymer according to claim 2 wherein the polyisocyanate is a diol extended polyisocyanate.

6. A polymer according to claim 5 wherein said diol extender is a polyoxyalkylene glyool.

7. A polymer according to claim 3 wherein said bicyclic amide acetal is tetrahydro-(7a-methyl)-oxazolo [2,3-b ] oxazole.

8. A polymer according to claim 5 wherein said bicyclic amide acetal is tetrahydro-(7a-methyl)-oxazolo [2,3-b] oxazole.

9. A polymer according to claim 5 wherein said diol extender is a polyoxyalkylene glycol.

10. A polymer according to claim 2 wherein said bicyclic amide acetal is tetrahydro-(7a-methyl)-oxazolo [2,3-b] oxazole.

* * * * *